(12) United States Patent
Koretz

(10) Patent No.: US 8,234,203 B1
(45) Date of Patent: Jul. 31, 2012

(54) E-COMMERCE SYSTEM INCLUDING ONLINE AUTOMATABLE INVENTORY MONITOR AND CONTROL SYSTEM

(75) Inventor: David A. Koretz, Rochester, NY (US)

(73) Assignee: Adventive, Inc., Rochester, NY (US)

( * ) Notice: Subject to any disclaimer, the term of this patent is extended or adjusted under 35 U.S.C. 154(b) by 3906 days.

(21) Appl. No.: 09/853,726

(22) Filed: May 11, 2001

Related U.S. Application Data

(60) Provisional application No. 60/203,803, filed on May 12, 2000.

(51) Int. Cl.
G06Q 40/00 (2006.01)
(52) U.S. Cl. .......................... 705/37; 705/27
(58) Field of Classification Search ............... 705/37, 705/26, 14, 80, 219, 35, 36 R; 379/88.2
See application file for complete search history.

(56) References Cited

U.S. PATENT DOCUMENTS

| | | |
|---|---|---|
| 5,101,425 A | 3/1992 | Darland et al. |
| 5,210,789 A | 5/1993 | Jeffus et al. |
| 5,442,707 A | 8/1995 | Miyaji et al. |
| 5,509,074 A | 4/1996 | Choudhury et al. |
| 5,551,030 A | 8/1996 | Linden et al. |
| 5,615,268 A | 3/1997 | Bisbee et al. |
| 5,617,114 A | 4/1997 | Bier et al. |
| 5,640,577 A | 6/1997 | Scharmer |
| 5,694,563 A | 12/1997 | Belfiore et al. |
| 5,727,057 A | 3/1998 | Emery et al. |
| 5,737,424 A | 4/1998 | Elteto et al. |
| 5,774,668 A | 6/1998 | Choquier et al. |
| 5,790,790 A | 8/1998 | Smith et al. |
| 5,790,793 A | 8/1998 | Higley |
| 5,794,207 A | 8/1998 | Walker et al. ............... 705/23 |
| 5,794,259 A | 8/1998 | Kikinis |
| 5,802,518 A | 9/1998 | Karaev et al. |
| 5,805,811 A | 9/1998 | Pratt et al. |
| 5,835,896 A | 11/1998 | Fisher et al. ............... 705/37 |
| 5,845,281 A | 12/1998 | Benson et al. |
| 5,848,131 A | 12/1998 | Moore et al. |
| 5,848,161 A | 12/1998 | Luneau et al. |
| 5,855,006 A | 12/1998 | Huemoeller et al. |
| 5,870,470 A | 2/1999 | Johnson et al. |
| 5,870,544 A | 2/1999 | Curtis |
| 5,875,296 A | 2/1999 | Shi et al. |
| 5,878,141 A | 3/1999 | Daly et al. |
| 5,890,138 A | 3/1999 | Godin et al. ............... 705/26 |
| 5,893,118 A | 4/1999 | Sonderegger |
| 5,895,454 A | 4/1999 | Harrington ............... 705/26 |
| 5,897,622 A | 4/1999 | Blinn et al. ............... 705/26 |
| 5,899,980 A | 5/1999 | Wilf et al. ............... 705/26 |

(Continued)

OTHER PUBLICATIONS

Michael Miller (The Complete Idiot's Guide to Online Auctions, Copyright Jul. 1999).*

(Continued)

*Primary Examiner* — Ojo O Oyebisi
(74) *Attorney, Agent, or Firm* — LeClairRyan, a Professional Corporation

(57) ABSTRACT

An e-commerce system offering retail, instant buy, and auction sales models automatically moves items for sale between the sales models according to seller-defined criteria, such as elasticity of demand, cash generation, time in sales model, and quantity in sales model. The retail sales model includes a virtual storefront creation tool with which sellers can create and customize their own virtual storefronts. The system lists items offered for sale in the retail and instant buy sales models by sellers with virtual storefronts in the sellers' storefronts.

24 Claims, 13 Drawing Sheets

U.S. PATENT DOCUMENTS

| | | | |
|---|---|---|---|
| 5,905,973 A | 5/1999 | Yonezawa et al. | 705/27 |
| 5,917,491 A | 6/1999 | Bauserfeld | |
| 5,940,807 A | 8/1999 | Purcell | 705/26 |
| 5,946,665 A | 8/1999 | Suzuki et al. | 705/26 |
| 5,948,040 A | 9/1999 | DeLorme et al. | |
| 5,956,709 A | 9/1999 | Xue | 707/3 |
| 5,960,411 A | 9/1999 | Hartman et al. | |
| 5,963,949 A | 10/1999 | Gupta et al. | |
| 5,970,475 A | 10/1999 | Barnes et al. | 705/27 |
| 5,974,441 A | 10/1999 | Rogers et al. | |
| 5,987,423 A | 11/1999 | Arnold et al. | 705/14 |
| 5,991,740 A | 11/1999 | Messer | 705/27 |
| 5,999,914 A | 12/1999 | Blinn et al. | 705/26 |
| 5,999,938 A | 12/1999 | Bliss et al. | |
| 6,006,332 A | 12/1999 | Rabne et al. | |
| 6,058,417 A * | 5/2000 | Hess et al. | 709/219 |
| 6,065,046 A | 5/2000 | Feinberg et al. | |
| 6,085,166 A | 7/2000 | Beckhardt et al. | |
| 6,219,669 B1 | 4/2001 | Haff et al. | |
| 6,266,651 B1 * | 7/2001 | Woolston | 705/27 |
| 6,269,135 B1 | 7/2001 | Sander | |
| 6,369,840 B1 | 4/2002 | Barnett et al. | |
| 6,598,027 B1 * | 7/2003 | Breen et al. | 705/26 |
| 6,647,370 B1 | 11/2003 | Fu et al. | |
| 6,658,473 B1 | 12/2003 | Block et al. | |
| 6,763,335 B1 | 7/2004 | Nanbu et al. | |
| 6,879,691 B1 | 4/2005 | Koretz | |
| 6,938,256 B2 | 8/2005 | Deng et al. | |
| 6,986,076 B1 | 1/2006 | Smith et al. | |
| 6,993,572 B2 | 1/2006 | Ross, Jr. et al. | |
| 7,124,101 B1 | 10/2006 | Mikurak | |
| 2001/0049613 A1 | 12/2001 | Gramann, III et al. | |
| 2002/0099576 A1 | 7/2002 | MacDonald et al. | |
| 2004/0010451 A1 | 1/2004 | Romano et al. | |
| 2004/0039626 A1 | 2/2004 | Voorhees | |
| 2004/0139154 A1 | 7/2004 | Schwarze | |
| 2005/0097204 A1 | 5/2005 | Horowitz et al. | |
| 2005/0149417 A1 | 7/2005 | Crescenzo et al. | |
| 2005/0204367 A1 | 9/2005 | Minium, Jr. et al. | |
| 2005/0223392 A1 | 10/2005 | Cox et al. | |
| 2006/0020950 A1 | 1/2006 | Ladd et al. | |
| 2007/0198432 A1 | 8/2007 | Pitroda et al. | |
| 2007/0233556 A1 | 10/2007 | Koningstein | |
| 2007/0240029 A1 | 10/2007 | Kitada et al. | |
| 2010/0017874 A1 | 1/2010 | Piccinini et al. | |

OTHER PUBLICATIONS

BuyTextiles.com (http://www.ecompartners.com/buytextiles/html/listing_help.htm), pp. 1-4, 1999.*

David Koretz.com (http://dkoretz.typepad.com/rants/2006/06/featuretisement.html), 1-3 (2006).

International Search Report for International Patent Application No. PCT/US07/71521, Jan. 7, 2008.

International Search Report for International Patent Application No. PCT/US07/71524, Jul. 15, 2008.

International Search Report for International Patent Application No. PCT/US07/71525, Aug. 27, 2008.

International Search Report for International Patent Application No. PCT/US09/35127, Apr. 13, 2009.

Miller, Michael, "The Complete Idiot's Guide to Online Auctions," 1999.

Written Opinion of the International Searching Authority for International Patent Application No. PCT/US09/35127, Apr. 3, 2009.

* cited by examiner

Storefront Creation

Welcome to the storefront creation system. Please enter at least the information for the fields marked with an asterisk (*).

Company Name:
Title of New Store:

Contact Information

Title:
First Name:
Middle Name:
Last Name:
Suffix:
Job Title:
Business Phone:
Assistant's Phone:
Business Fax:
Home Phone:
Home Fax:
Mobile Phone:
Other Phone:
Time Zone:
E-mail Address:

Billing Address

Street 1:
Street 2:
City:
State/Province:
Zip/Postal Code:
Country/Region:

Mailing Address (if different from Billing Address)

Street 1:
Street 2:
City:
State/Province:
Zip/Postal Code:
Country/Region:

FIG. 8

Storefront Creation

Back | Forward | Reload

Please select which method you wish to use:

● Easy

○ Advanced

[Select]

FIG. 9

Storefront Creation

Back | Forward | Reload

Please a Layout for your Main and Category Pages:

Main Page Layout

●

Category Page Layout

○

[Select]

```
⊠ 🗗 🗖                    Auctions
Back | Forward | Reload

BROWSE AUCTIONS          Main | Auction Watch | Auction Manager | Sell

SEARCH AUCTIONS          Desktop Computers

Search For:              Operating System
[          ] [go]           Windows OS
                            Macintosh OS
☐ Search just in Computer   Unix OS
  Hardware
                         Processor Manufacturer
[Search All Categories ▼]   Intel
                            AMD
                            Motorola
                            IBM AUCTION QUICK VIEW:  All Current  Ending Today  Finished  New Today

| ID  | Title          | # Bids  | Current Bid  | Ending |
```

FIG. 17

```
⊠ 🗗 🗖                   Instant Buy
Back | Forward | Reload

INSTANT BUY              Main | Submit Instant Buy | Edit Instant Buy

SEARCH INSTANT BUY

[                    ]
Search by: ○Store  ●Keyword        [go!]

Instant Buy Categories
 • Clothing & Accessories
 • Computer Hardware
 • Computer Accessories & Media
 • Computer Software
 • Telephones & Communication Equipment
 • Furniture & Office Furnishings
 • Office Supplies
 • Reference Materials
 • Business Machines
```

FIG. 18

E-COMMERCE SYSTEM INCLUDING ONLINE AUTOMATABLE INVENTORY MONITOR AND CONTROL SYSTEM

This application claims the benefit of U.S. Provisional Application No. 60/203,803, filed 12 May 2000, which provisional application is incorporated by reference herein.

TECHNICAL FIELD

The invention relates to improved e-commerce systems.

BACKGROUND OF THE INVENTION

Current e-commerce systems allow sales via retail models in which items have a set price disclosed to buyers who simply place an order, instant buy models in which items have set minimum prices undisclosed to buyers who bid on the item and have an opportunity to bid again after a time if their initial bids fall short of the price, and an auction sales model in which items may or may not have a minimum price undisclosed to buyers and in which the highest bidders purchase the items (unless a minimum price has not been met or exceeded). Each sales model is useful to businesses in their own way, and businesses offer items for sale in these models depending upon their immediate needs. However, no prior art system provides for easy movement of items between sales models for more efficient and beneficial sale of the items.

SUMMARY OF THE INVENTION

The instant invention overcomes the drawbacks of the prior art by allowing sellers to create and customize their own virtual storefronts. The system further allows sellers to designate criteria by which the system automatically moves items between sales models. In the preferred embodiment, the system offers retail, instant buy, and auction sales models. When a seller creates an item record within the retail or instant buy sales models, the seller provides descriptive text and/or graphics and can designate how and when the item should be removed from the particular initial sales model. Criteria available to the seller include elasticity of demand, cash generation, time in model, and quantity in model.

DESCRIPTION OF THE DRAWINGS

FIG. 8 is a schematic screenshot of a seller information gathering page of a storefront creation portion of the invention.

FIG. 9 is a schematic screenshot of a storefront creation path selection page of the invention.

FIG. 10 is a schematic screenshot of a layout selection page of the invention.

Figure 13:
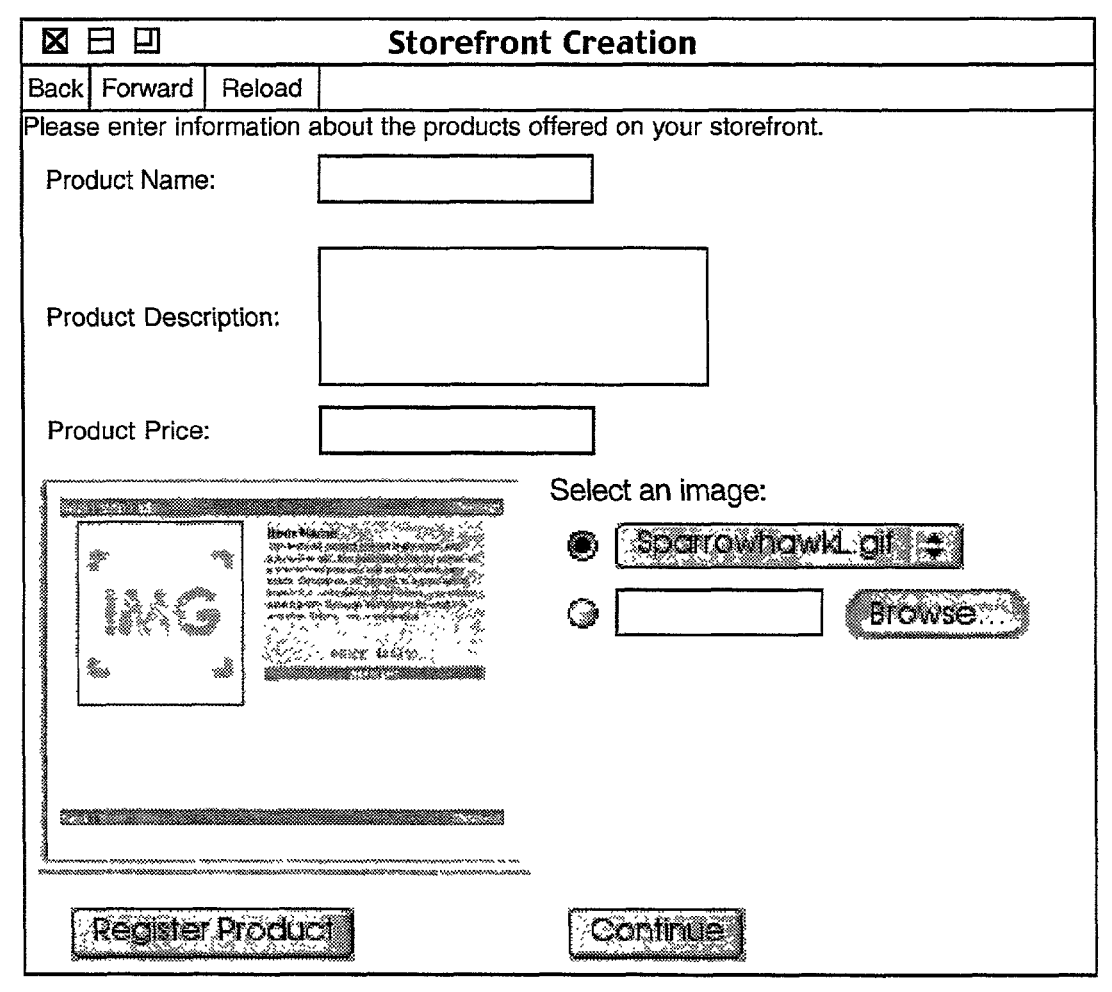

FIG. 13 is a schematic screenshot of an item description setup page of the invention.

FIG. 16 is a schematic screenshot of a second category level page reached by clicking a subcategory from the subcategory section of the first category level page shown in FIG. 11 ("Desktop Computers" from the subcategories of "Computer Hardware" in this example).

FIG. 17 is a schematic screenshot of a main instant buy page of the invention.

FIG. 18 is a schematic screenshot of an auction item setup page of the invention.

DESCRIPTION OF THE INVENTION

Figure 1:
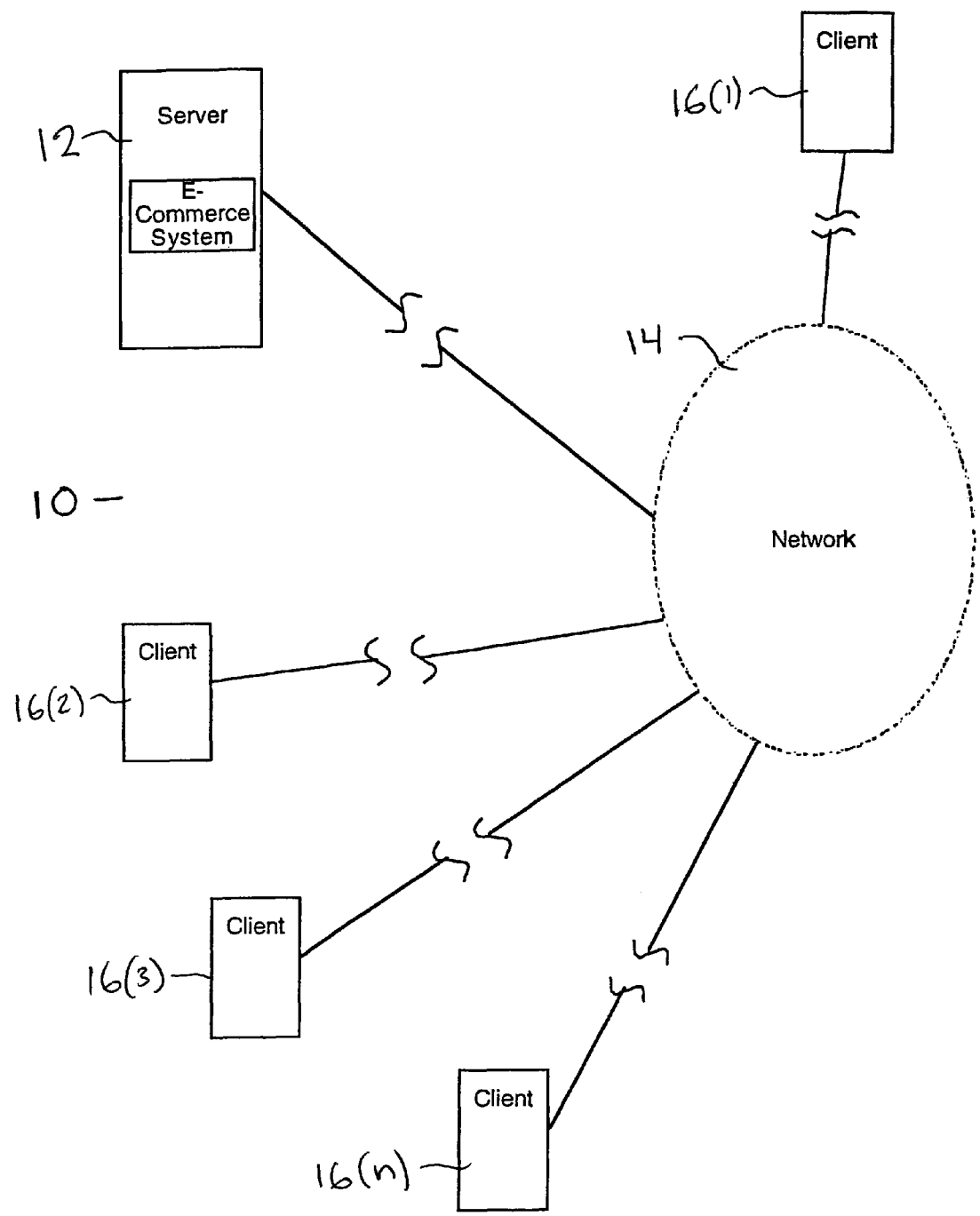
FIG. 1 is a schematic representation of the server, network, and clients used in the instant invention.
Figure 2:
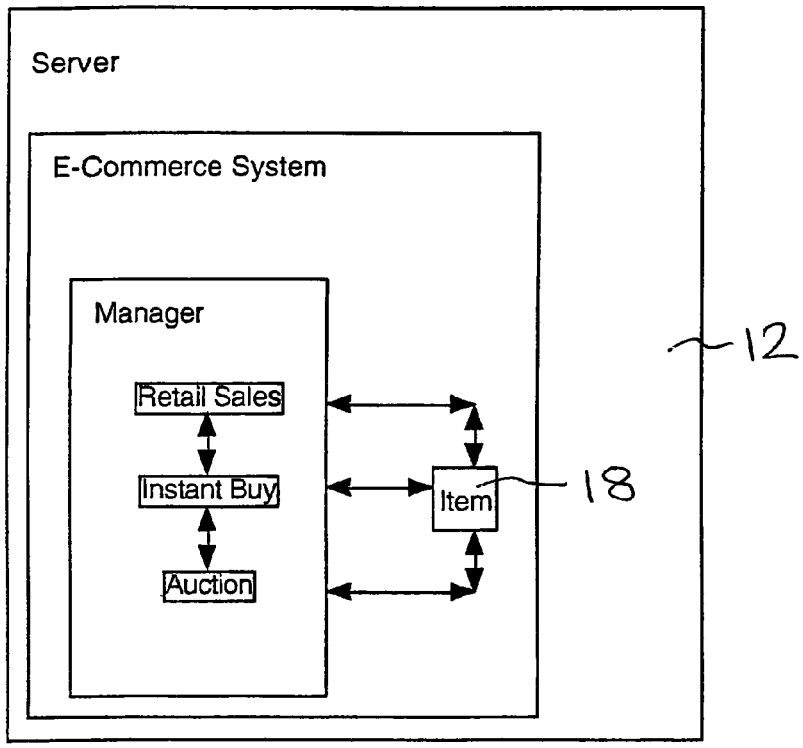
FIG. 2 is a schematic representation of the invention deployed in a server.

The system 10 includes an e-commerce system on a server computer 12, a network 14, and client computers 16(1)-16(n) as illustrated in FIGS. 1 and 2. The e-commerce system hosted on a server computer 12 is connected to and accessible via a computer network 14 by users using client computers 16(1)-16(n) also connected to the computer network 14. The e-commerce system is implemented on the server computer 12 as a computer program stored in at least one of a computer memory and a mass storage device. The e-commerce system also includes a manager that allows a seller to create a record of an item for sale 18, allows the seller to direct the system 12 to offer the item for sale according to a desired sales model, and can automatically move the item 18 between different sales models according to seller-determined variables.

The instant system includes three common basic tiers: retail, instant buy, and auction. Each tier is functional and useful independently of the other two as has been seen in prior art systems dedicated to each independently. However, I have found that these three models of online sales provide unexpected benefits and efficiencies when used in concert. These benefits accrue not only to the owner of the system, but also to the sellers and buyers subscribing to and using the system.

Retail Tier

Figure 3:
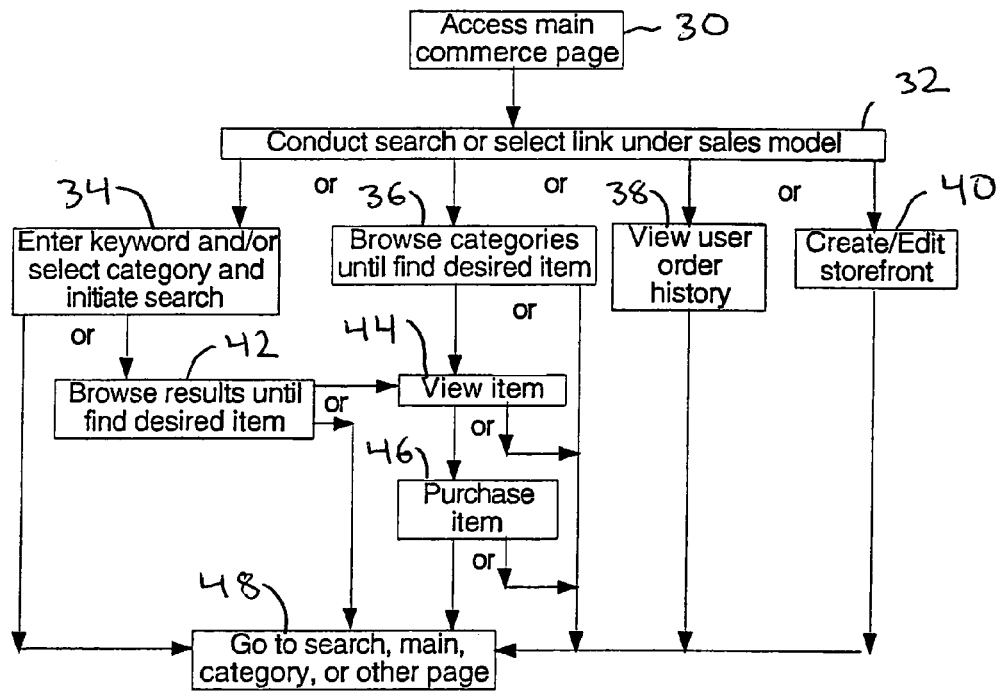
FIG. 3 is a schematic flow diagram of paths users can follow within the preferred embodiment of the invention.
Figure 7:
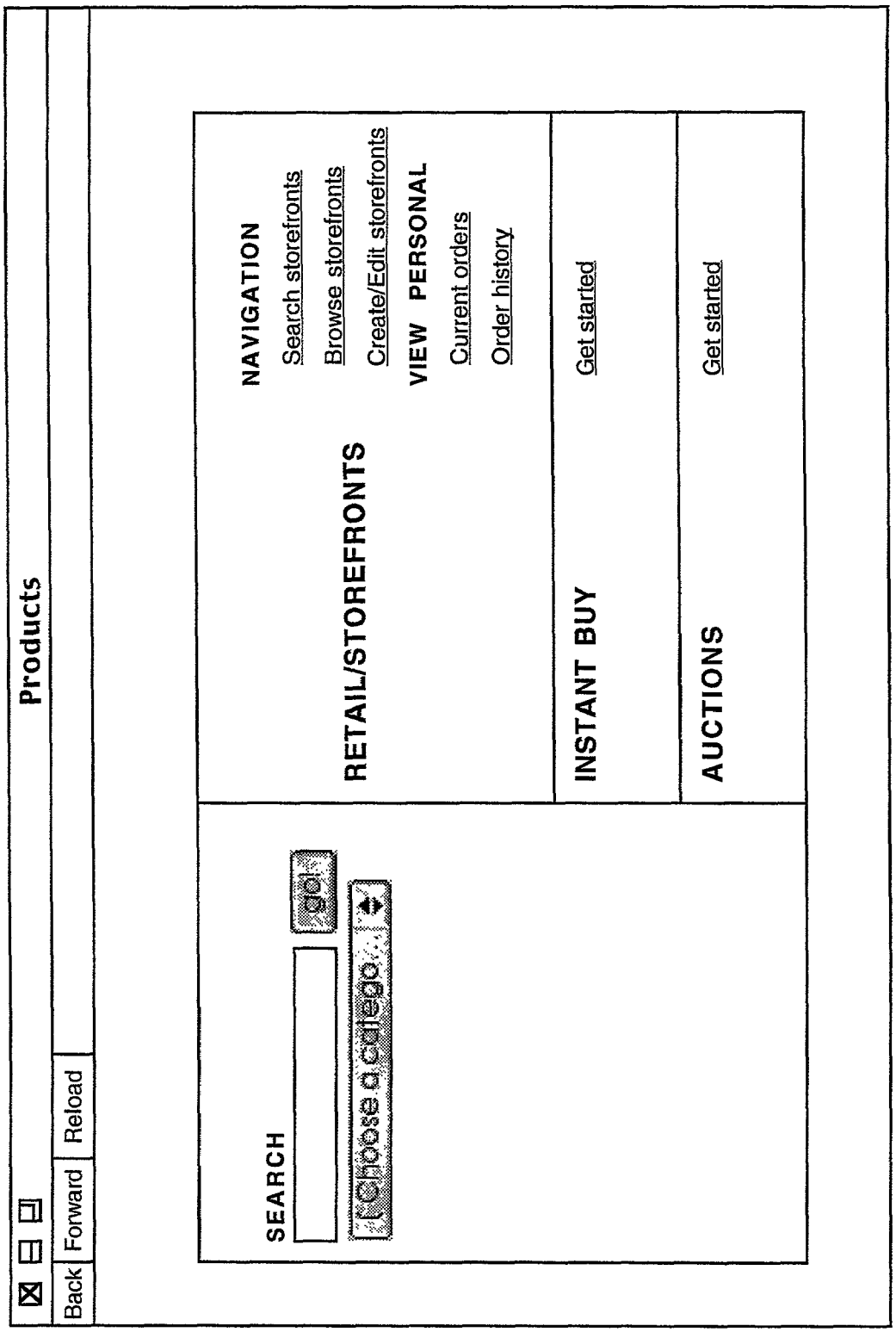
FIG. 7 is a schematic screenshot of a products path selection page of the invention.
Figure 11:
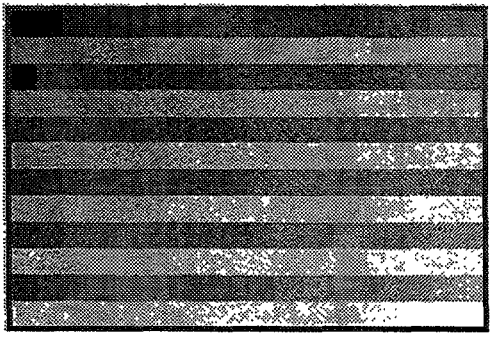
FIG. 11 is a schematic screenshot of a color scheme selection page of the invention.
Figure 12:
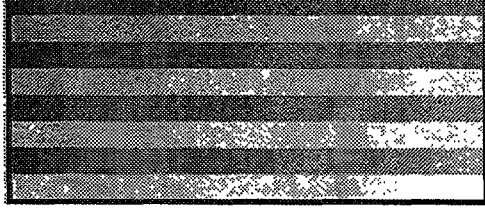
FIG. 12 is a schematic screenshot of a storefront logo upload page of the invention.
Figure 14:
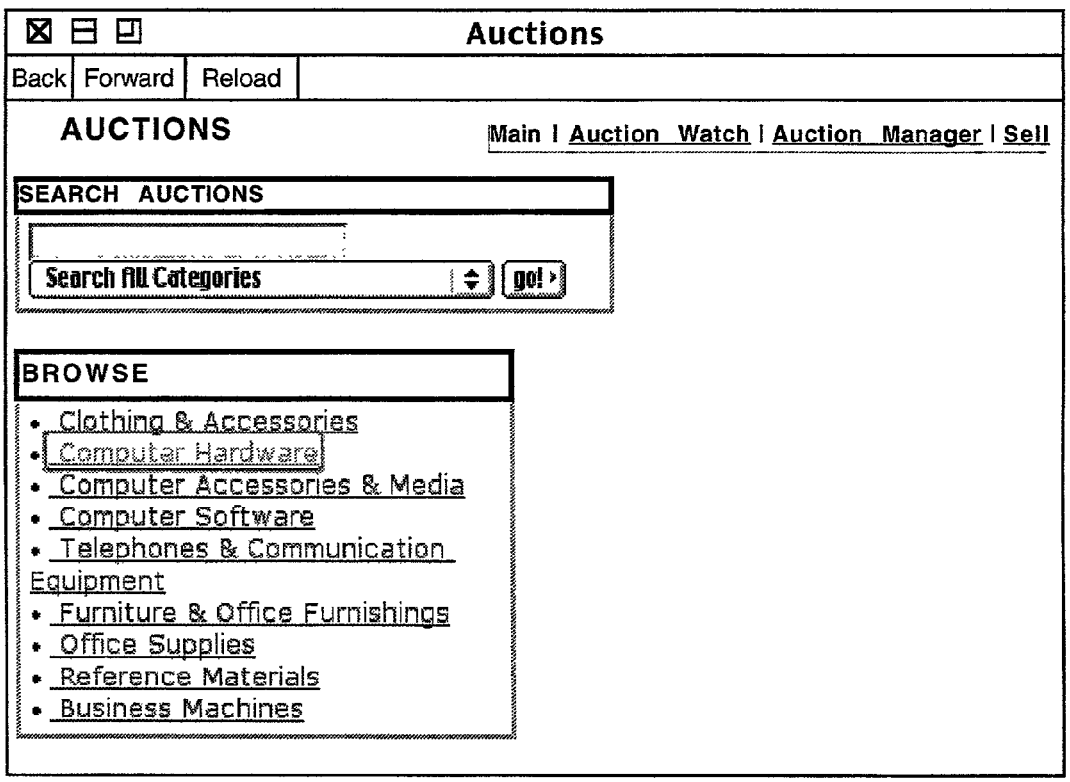
FIG. 14 is a schematic screenshot of a main auction page of the invention.
Figure 15:
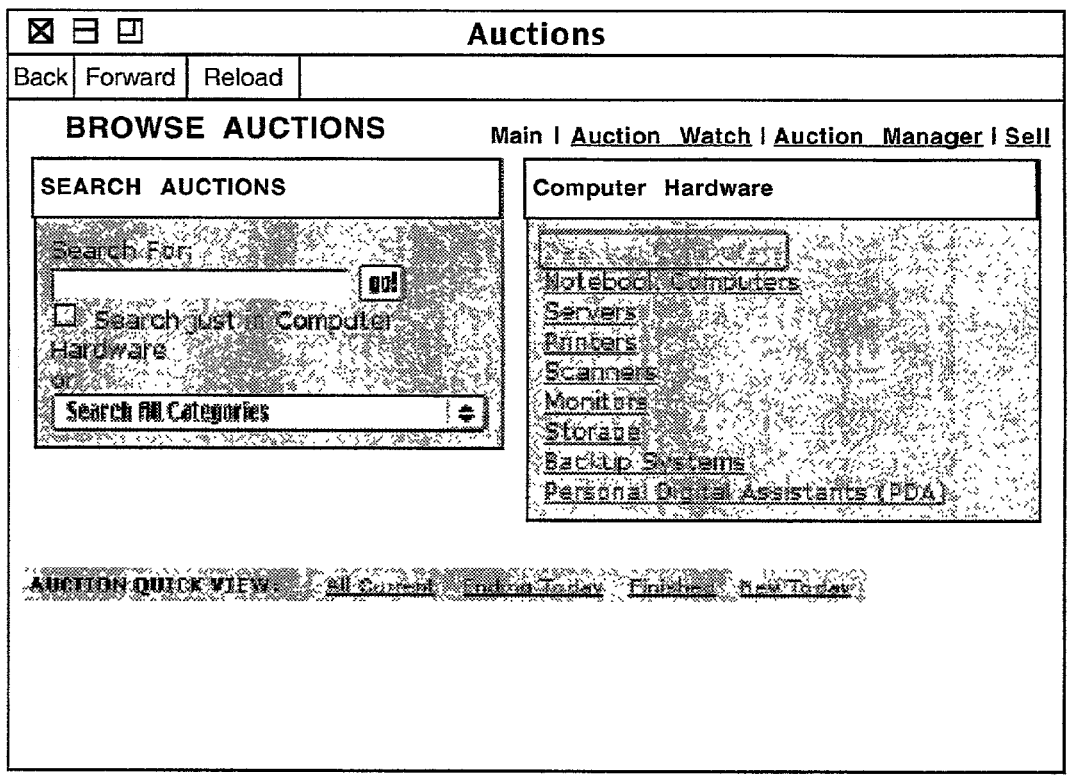
FIG. 15 is a schematic screenshot of a first category level page of the invention reached by clicking a category from the "Browse" section of the main auction page shown in FIG. 10 ("Computer Hardware" in this example) and offering subcategories.

The Retail tier includes virtual storefronts through which buyers shop for items they wish to buy (or browse until they find an item of interest), select a seller, and purchase items for pre-set prices without negotiation as illustrated in FIGS. 3 and 7. The tier has two sets of functionality: one for the buyer and one for the seller.

Referring to FIG. 3, in step 30 the main commerce page is accessed. Next, in step 32 either a search is conducted or a link under the current sales model is selected to steps 34, 36, 38, or 40. In step 34, a keyword is entered and/or a category is selected and the search is initiated. Next, in step 42 the results are browsed until the desired item is found. Next, in step 44 the item is viewed, may be purchased in step 46 and then may return to the search main category page or to another page in step 48. Alternatively, after step 44 the user may directly proceed to step 48 to return to the search main category page or to another page.

In step 36, categories are browsed until the desired item is found. Next, in step 44 the item is viewed and may be purchased in step 46. Alternatively, after step 44 the user may directly proceed to step 48 to return to the search main category page or to another page.

In step 38, the user's order history may be reviewed and then in step 48 would return to the search main category page or to another page.

In step 40, the storefront could be created/edited and then in step 48 would return to the search main category page or to another page.

The buyer's functionality set includes browsing storefronts, searching for particular storefronts, searching for a particular item, shopping in the storefronts using a shopping cart that is universal across all storefronts in the system, purchasing items in their carts, checking status of preexisting orders, and viewing histories of their purchases made through the instant system. All users of the system preferably have access to all of these functions, regardless of status.

The seller's functionality set differs from the buyer's since sellers have a different set of needs. A seller first creates a merchant account on the system, which preferably requires a fee for establishment of the account. Upon payment of the fee, the seller can create a storefront using an included storefront creation utility of the system, which allows two setup paths as illustrated in FIGS. 8-13.

The first storefront setup path emphasizes ease of use and follows a simple, step-by-step process through which the seller can quickly create an online presence and begin doing business. The second setup path offers more options and flexibility and can complete setup more quickly once the seller is familiar with the path. The second path is primarily for sellers who have an existing system storefront and wish to modify the storefront, or for sellers who are willing to tolerate a steeper learning curve in exchange for increased speed and flexibility in working with their storefronts.

The core components of the storefront via either path are the same: a main page, which can be used to sell items or to act as a welcoming area and means of accessing the rest of the storefront; category pages containing items and subcategories allowing grouping of items into logical divisions without limit on the breadth or depth of category structure; item detail pages including specific information about specific items available through the storefront; an "about the company" page on which the seller can provide buyers with information about the company and/or its storefront; a contact page that can include names, addresses, telephone numbers, e-mail addresses, and other contact information; and a custom page that can be used for whatever the storefront's creators choose. In addition to the page setup, a storefront includes many additional options, including payment and shipping methods, buyer notification methods, color schemes and layouts used by the storefront, method by which orders are sent to the company, users allowed to edit the storefront, and users allowed access to the storefront (where storefronts must restrict shopping to specified list of buyers (such as those exceeding a particular age limit)). Other functions supported by the storefront management system include search engine registration, system banner ad purchasing, sending mailings to requesting buyers, and statistics viewing (including per page, per hit, per visit, per sale, per reference, and per search information sorted on a variety of criteria over time periods ranging from a week to a year).

Instant Buy Tier

The system's Instant Buy tier offers savings to buyers and allows sellers to dispose of excess inventory without resorting to something as drastic as an auction. An item available through instant buy has a set price, which is the minimum amount that a seller will accept for the item. The price is not disclosed to the buyer, however, and so the buyer must place a bid on the item according to how much the buyer feels the item is worth. If this bid exceeds the set price, the item is immediately sold to the buyer; if not, the buyer must wait for a predetermined period, preferably an hour, before bidding again. This allows buyers to purchase items at a discount from their retail price while allowing sellers the potential to receive more for the items than they would get by reducing the price outright. Items sold via instant buy are placed on the seller's virtual store front so that the searching and browsing function operate in much the same fashion with respect to instant buy items as for retail items as illustrated in FIG. 17. Essentially, the only different between an item in the Retail tier and an item in the Instant Buy tier is the manner in which the sale is executed, so products in this tier can be managed in the same way that products in the Retail tier are managed.

Auction Tier

The system also offers online auction sales of items as illustrated in FIGS. 2, 5, 14-16 and 18. A seller need not be a registered seller to put an item up for auction since the Auction tier is viewable separately from the other two tiers. Like the other two tiers, auctions can be searched and browsed, but via a separate interface, and the items are organized into categories rather than in sellers' storefronts. Auctions can be for single items or for multiple items; multiple item auctions preferably use the Dutch auction format. A buyer viewing an item up for auction can retrieve the e-mail address of the seller to ask questions about the item. The system preferably notifies by e-mail any buyer placing a bid on an item if he or she is later outbid. At the end of the auction, the system preferably notifies by e-mail both the winning bidder and the seller. I prefer to include the contact address of the winning bidder in the seller's message and vice versa. I also prefer to offer sellers the ability to process credit card payments at their storefronts, including payments for items the seller sold via the Auction tier.

System Features

Figure 4:
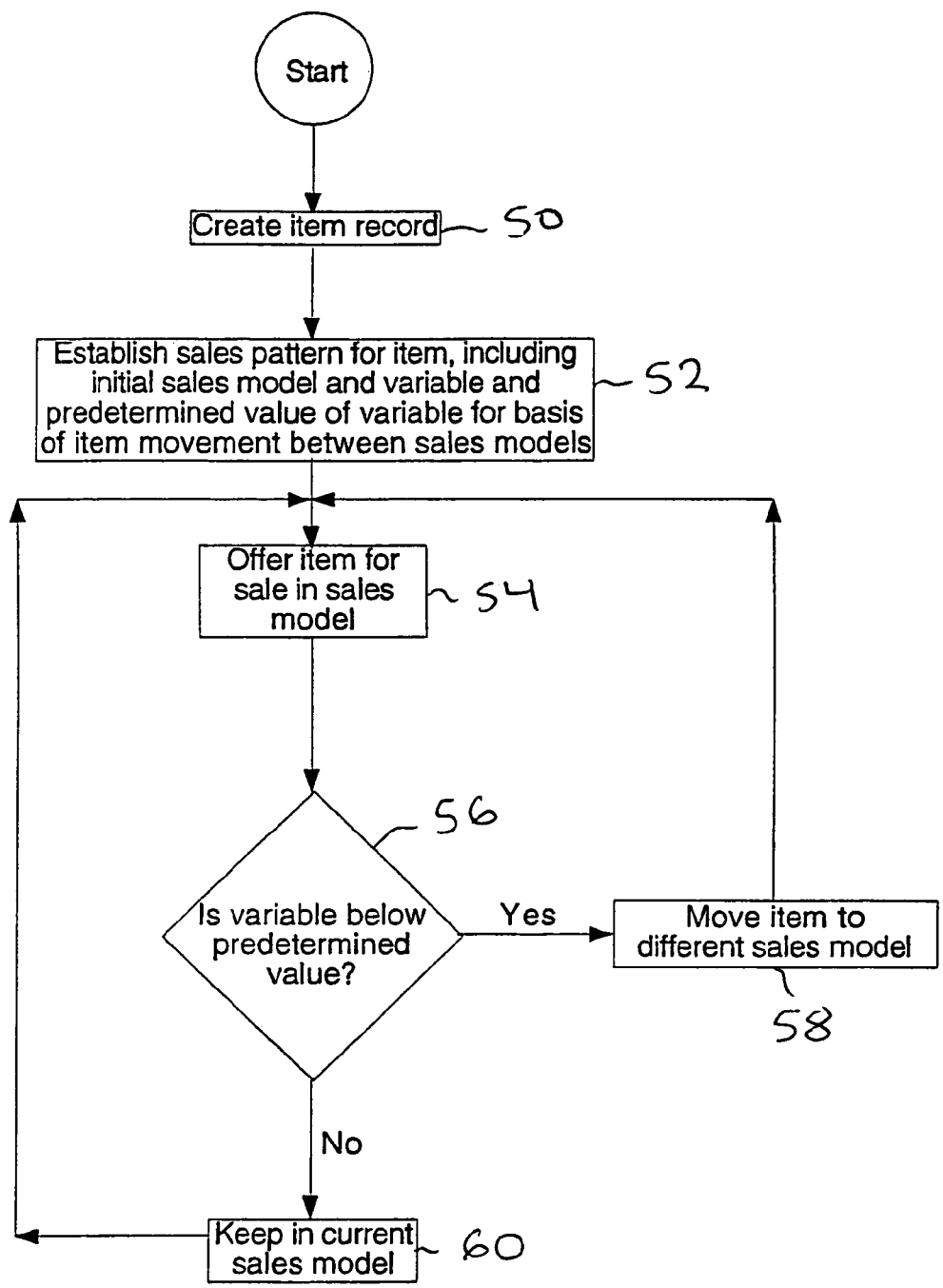
FIG. 4 is a schematic flow diagram of a preferred implementation of the automated item movement feature of the invention.

Referring to FIG. 4, an implementation of the automated item movement feature of the invention is illustrated. In step 50, an item record is created. Next, in step 52 a sales pattern for the item is established, including an initial sales model and the variable and the predetermined value of variable for the basis of item movement between sales models. Next, in step 54 the item is offered for sale in the sales model.

In step 56 a determination of whether the variable is below the predetermined value. If the variable is below the predetermined value, then the Yes branch is taken in step 56 to step 58. In step 58, the item is moved to a different sales model and then in step 54 the item is offered for sales in the different sales model. If the variable is not below the predetermined value, then the No branch is taken in step 56 to step 60. In step 60, the current sales model is kept and the item is offered for sale under the same sales model.

Figure 5:
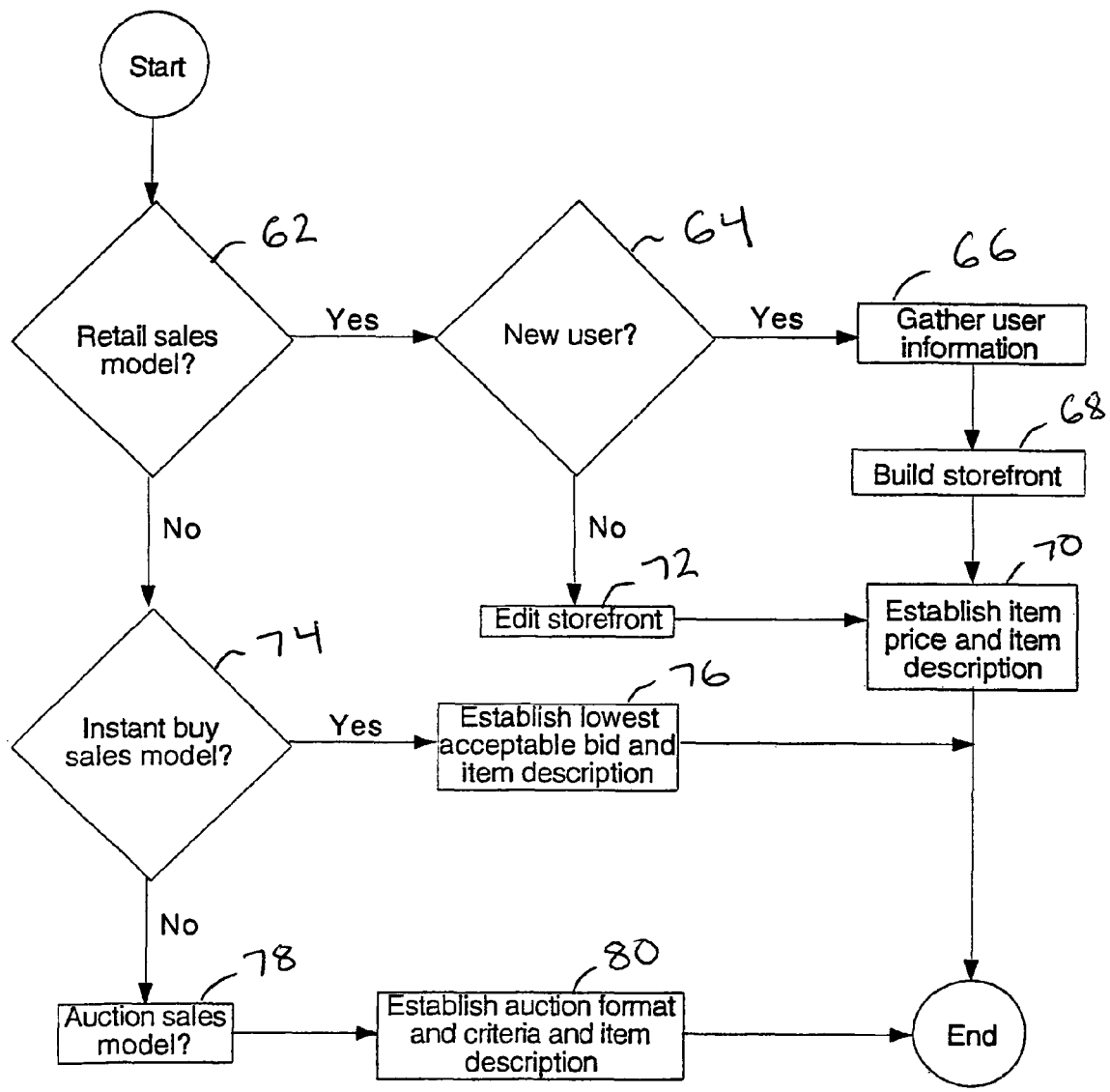
FIG. 5 is a schematic flow diagram of a preferred implementation of item record creation in the invention.

Referring to FIG. 5, an implementation of the item record creation in the invention is illustrated. In step 62, a determination is made on whether the retail sales model will be used. If the retail sales model will be used, then the Yes branch is taken in step 62 to step 64 where a determination is made whether this is a new user. If it is a new user, then the Yes branch is taken in step 64 to step 66 where user information is gathered. Next, in step 68 a storefront is built as described herein and illustrated in FIGS. 8-13. Next, in step 70 a price for the item and a description for the item are established. If it is not a new user, then the No branch is taken in step 64 to step

70 where the storefront can be edited. Next, in step 70 a price for the item and a description for the item are established.

If the retail sales model will not be used, then the No branch in step 62 is taken to step 74 where a determination is made on whether an instant buy sales model will be used. If the instant buy sales model will be used, then the Yes branch is taken in step 74 to step 76. In step 76, the lowest acceptable bid and a description of the item are established. If the instant buy sales model will not be used, then the No branch is taken in step 74 to step 78. In step 78, the auction sales model is selected and then in step 80 an auction format and criteria along with a description of the item are established.

Figure 6:
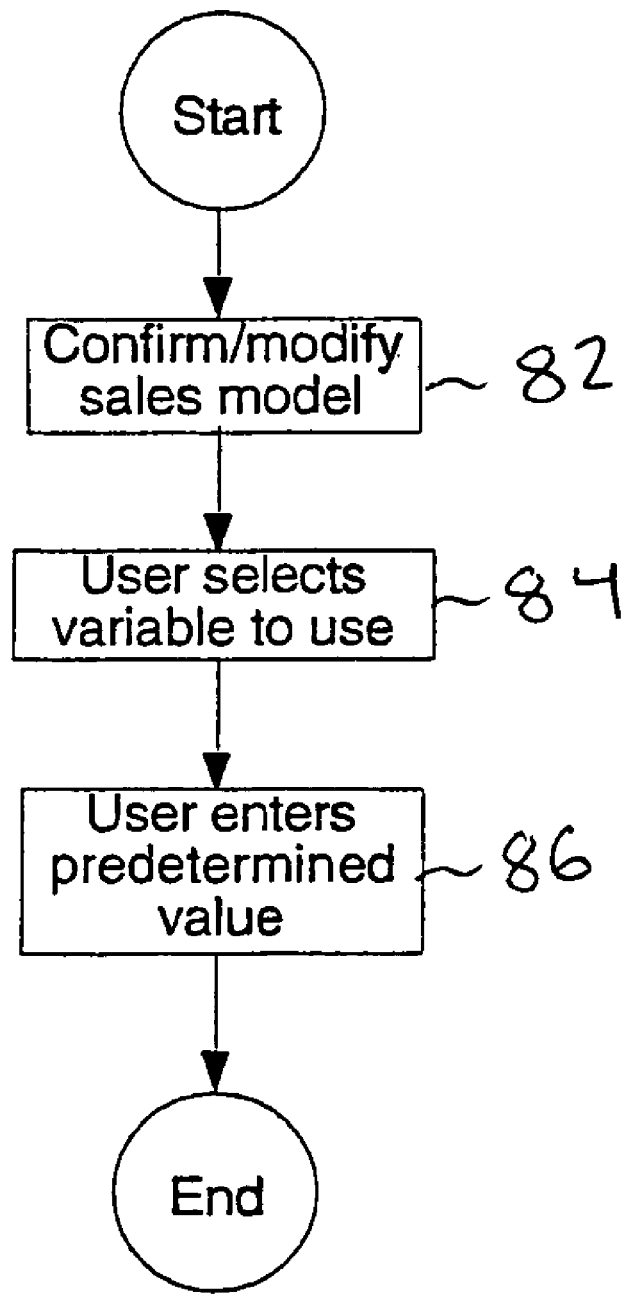
FIG. 6 is a schematic flow diagram of a preferred implementation of variable selection and variable value selection for item movement in the invention.

Referring to FIG. 6, an implementation of the variable selection and variable value selection for item movement in the invention is illustrated. In step 82, the sales model is confirmed or modified. Next, in step 84 the user selects a variable to use and in step 86 the user enters a predetermined value.

The three tiers of the system work together to provide unique features to its users. One of these features is Price Tracker, which monitors an item's retail price and notifies a buyer when the price is lowered to a certain point or when the item becomes available for purchase via instant buy or auction.

The three-tier model offers advantages to sellers as well. The system enables sellers to autonomously shift items through the three-tiered sales system based on any given variable. My preferred implementation allows the seller to shift items based on elasticity of demand (what others charge for the same or comparable items) or based on sales increase. All instant buy and retail orders are retrievable via the same method. For example, a seller could shift an item that was selling poorly from its online purchasing system (virtual storefront) into its instant buy system or to auctions to quickly eliminate excess inventory or to quickly generate cash at a reduced profit margin. The system can base the movement of items on three variables: specific dates, specific quantities, and elasticity of demand.

Other features of my three-tiered system include a universal shopping cart and a unified check-out system. The universal shopping cart allows buyers to browse through multiple storefronts on the system and store all of the products in a single shopping cart. When the buyers are ready to check out, the unified check-out system enables buyers to purchase items in their carts from multiple vendors, but only bill the buyers' credit card once. This drastically increases the efficiency of buyers by enabling them to shop thousands of stores with one cart and buying multiple items in one transaction, so the buyers only have to enter credit card information once. Where the system retains seller payment information, the seller only need wait for a single credit authorization.

The browse function of the system presents the buyer with a list (broken into pages) of open storefronts available. These storefronts are sorted into categories as indicated by sellers at the time of storefront creation or storefront maintenance.

The search function presents the buyer with the option of searching for storefronts or searching for items. The buyer provides keywords with which the system develops a query and looks for the desired type of object. The system returns results of the search in a list (broken into pages) of the objects matching the query. I prefer to offer item-only searching within individual storefronts and within the Auction tier.

The buyer accesses the PriceTracker function from a page where an item is offered for sale in the Retail tier, preferably in the form of a hot link or other buyer-activatable object. When activated, the system presents the buyer with a page offering a price setting with which the buyer selects the price at which the buyer should be notified. When the item's price drops to or below the selected price, or if the item is shifted to the Instant Buy tier or the Auction tier, the system sends an e-mail message to the buyer at his or her subscriber address. The buyer can preferably stop tracking, for example, by going to a buyer options page and activating a button or other interactive object that stops the tracking.

Creating a Storefront

As discussed above and illustrated in FIGS. 8-13, the system presents sellers with two paths to storefront creation: a basic path in which the system leads the seller through a step-by-step storefront creation method; and an advanced path in which the system offers the seller more options and a faster storefront, but which has a steeper learning curve. The advanced path preferably requires the seller to start by entering company information (including, for example, contact information and company name). Once this is done, the seller is asked for storefront information, such as title of the storefront and categories in which to place the storefront. From there, the seller must select a layout for each type of page in the storefront (such as main page, category pages, item detail pages, about page, and contact page), as well as a color scheme to apply to the storefront. I prefer to allow sellers to create their own color schemes if they so choose using a system-resident color picker. Once this step is complete, the storefront is complete enough that the seller can enter the "manager" or "administration" page, which includes a task list informing the seller of the tasks yet to be completed before the storefront can be opened for business.

The basic path leads the seller through the process from creation to opening. This includes everything in the advanced path, including more automated setup of the required pages (main, contact, about), adding categories and items, and setting storefront options such as payment and shipping methods available, buyer notification, order notification, access restriction (if any), and the "publication" of the storefront on the system. The storefront can also be publicized in ads and in mass e-mailings.

Storefront management, as intimated above, is accomplished via "manager" or "administration" page that allows sellers to manage all aspects of their online store. As described above, this page presents the seller with a to-do list that provides a list of tasks that must be completed before the storefront is ready for business. The seller can change the layout of a type of page in the storefront by selecting a new type from a list of options, then selecting a color scheme to apply to the page. The color scheme can be pre-defined or custom made by the seller as in the set-up process described above.

The system allows the seller to edit the categories into which the storefront is listed, preferably by browsing a category "tree" that includes items in the seller's store. The seller can add and remove subcategories by, for example, clicking "Add" and "Remove" buttons. The seller can also add, edit, and remove products from a database of products the storefront carries by selecting a product in the list and pressing a button corresponding to the desired action. The system allows sellers to add and remove products from a category the seller edits.

I prefer to offer sellers a way to change text and image content of the contact page. From the management page, the seller can activate an object that invokes the contact page editor. The editor preferably places the text in a form field that allows the seller to edit the text and presents the seller with options to allow uploading of and linking to new images. The seller can also change the e-mail address to which customer inquiries are sent. The system offers similar features for the about page.

The system displays a storefront logo in various set locations in most layouts available to the seller. The seller can change which image to use for the logo.

The manager page offers a "publish storefront" option that instructs the system to "open" the storefront for business and allows buyers and browsers access to the storefront. The seller can also "unpublish" the storefront, closing the storefront and preventing buyers and browsers from accessing the storefront; this option would ordinarily be selected before the seller made major changes to the storefront. To publicize the opening of the storefront, the system includes an active object that allows registration of the storefront with search engines; the seller completes a brief form and the system submits the storefront site to various search engines. The seller can gain additional publicity by purchasing banner ads displayed on other portions of the system and to other visitors to the system's web site.

The manager allows the seller to view page, product, referral, search, and advertising statistics. Page statistics include the number of hits on, the number of sales from, and total revenue generated by the storefront. Product statistics include the number of sales of and total revenue generated from particular products. Referral statistics include information about web sites referring buyers to the seller's storefront, such as URL of the referrer, number of referrals, number of sales resulting from referrals, and total revenue from referral-based sales. Search statistics include keywords used by buyers and the number of times each keyword is used, allowing sellers to tailor their descriptions to buyer expectations. Advertising statistics help the seller to estimate the effectiveness of ads purchased from and displayed by the system by providing information on such items as the number of clicks from ads and purchases resulting from such clicks. All of these statistics are preferably strobe and can preferably be viewed over different periods, such as periods ranging from one week to a year.

At the seller's option, the system can display all orders placed at the storefront that have not been marked as "shipped" by the system. To mark an order "shipped," the seller selects an item from the list of orders, optionally enters a tracking number, and clicks an object such as a "ship" button. If the seller has so configured the storefront, the system sends notification e-mails to the recipient of the shipment and/or the buyer.

The seller can send mailings to customers who have requested (by completing a form accessible from the storefront) placement on a storefront mailing list. The list of recipients can be downloaded from the page for use by the seller as the seller sees fit.

Other features I prefer to offer in the storefront manager portion of the system include buyer access editing (seller can create or edit list of buyers allowed to access a restricted storefront), shipping options editing (seller can change shipping methods available to seller, preferably via a list of checkboxes), payment options editing (similar to shipping options, but with payment methods instead of shipping methods), buyer notification options editing (seller can tell system to send message to buyer when order ships and can set subject and body text of message), and order retrieval options editing (seller can choose whether new orders will be retrieved from storefront management page, e-mailed to seller, or faxed to seller).

Figure 18:
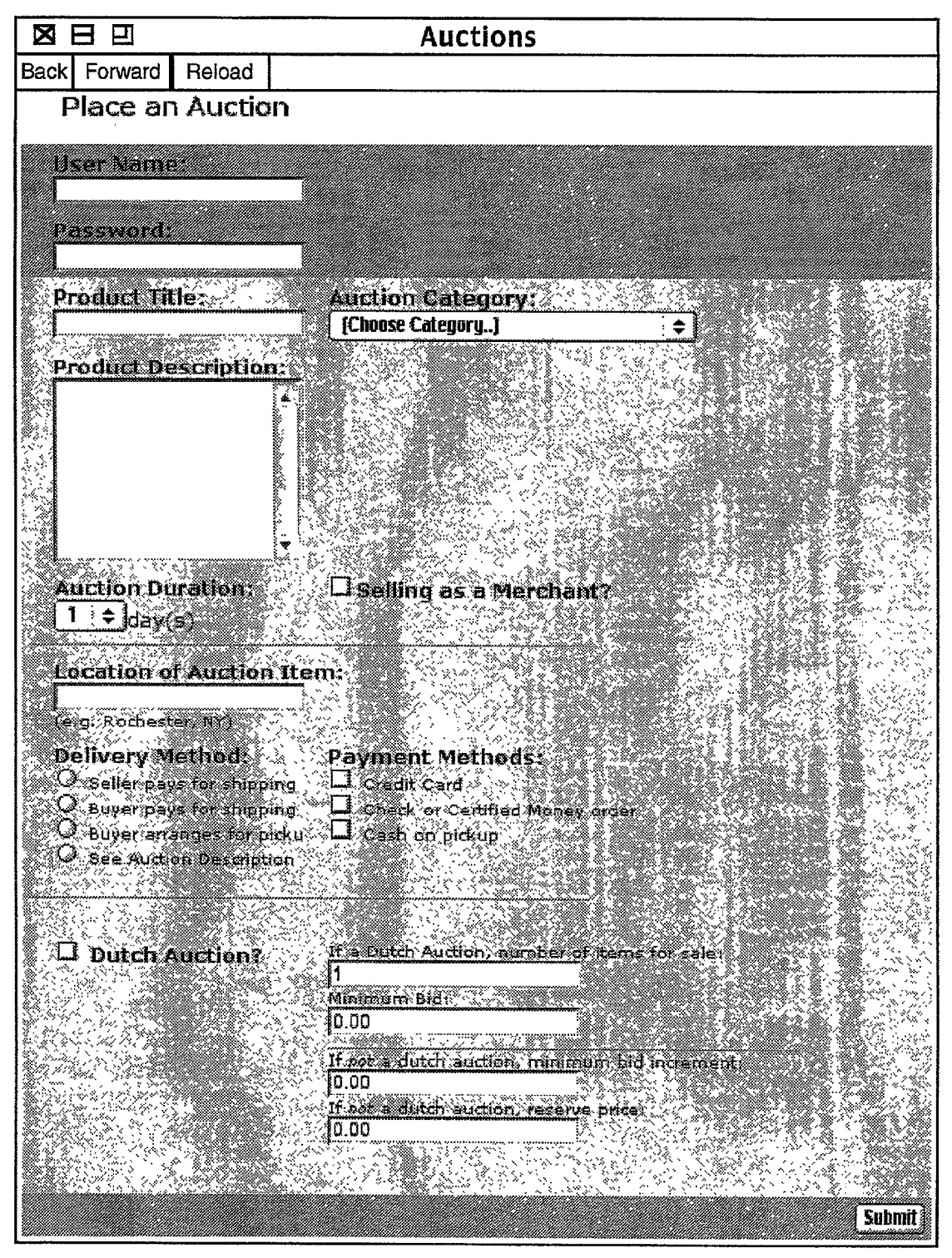

The Auction tier includes its own feature set as shown in FIG. 18, some of which are similar to features of the Retail tier. All sellers can set up an auction for single or multiple items for other buyers to search, browse, and place bids. When multiple items are placed in a single auction, Dutch auction format is my preferred implementation of the auction. Sellers can upload or create HTML tags in a description area of the auction to enhance the description of the item(s). The system allows sellers to, preferably for a fee, place an auction in special regions of the system, such as a front page or a gallery where buyers have easier access to the auction.

I claim:

1. A method for conducting e-commerce with an e-commerce computer system over a network between a plurality of client computer systems, the method comprising:
   establishing one of two or more sales models for an item in an e-commerce computer system;
   establishing a value for at least one variable which is a threshold for changing the established sales model to another one of the sales models before the item is offered for sale under the established sales model in the e-commerce computer system;
   offering the item for sale under the established sales model with the e-commerce computer system;
   determining with the e-commerce computer system if the value is satisfied; and
   automatically moving the item from the established sales model to the another one of the sales models with the e-commerce computer system when the determining determines the value is satisfied.

2. The method as set forth in claim 1 further comprising:
   receiving a selected price for the item with the e-commerce computer system from one of the plurality of client computer systems;
   monitoring with the e-commerce computer system which of the two or more sales models is established for the item; and
   providing a notification from the e-commerce computer system to the one of the client computer that provided the selected price when one of a listed price of the item is at or below the selected price for the item and the monitored one of the two or more sales models is one of an instant buy sales model and an auction sales model.

3. The method as set forth in claim 1 further comprising a providing a plurality of storefronts in the e-commerce computer system each offering one or more of the items for sale under one of the sales models.

4. The method of claim 3 further comprising collecting one or more of the items from the plurality of storefronts in a single cart in the e-commerce computer system.

5. The method of claim 3 further comprising providing a unified checkout system at the e-commerce computer system that the items from the plurality of storefronts to be purchased with a single payment transaction.

6. The method as set forth in claim 1 wherein the at least one variable established for the e-commerce computer system comprises at least one of demand elasticity, sales rate, cash generation, time within the established one of the two or more sales models, and quantity of the item.

7. The method as set forth in claim 1 wherein the two or more sales models for the e-commerce computer system comprise a retail sales model, an instant buy sales model, and an auction sales model.

8. The method as set forth in claim 1 further comprising creating at least one virtual storefront for the established sales model in the e-commerce system.

9. The method of claim 8 wherein the creating the at least one virtual storefront further comprises:

providing a plurality of templates to select from for the at least one virtual storefront with the e-commerce computer system;

providing at least one of a plurality of color schemes and a color picker to create a color scheme of for the at least one virtual storefront with the e-commerce computer system;

receiving a selection of one of the plurality of templates and one of the plurality of color schemes and the color picker at the e-commerce computer system.

10. The method as set forth in claim system of claim 8 wherein the creating at least one virtual storefront further comprises creating at least one of a main page, an about page, and a contact page with the e-commerce computer system.

11. The method of claim 7 wherein the instant buy sales model comprises:

offering the item for sale at a first undisclosed price with the e-commerce computer system;

receiving an offer to purchase the item at a first disclosed price from one of the client computer systems; and selling the item with the e-commerce computer system to the one of the client computer systems that provided the first disclosed price if the first disclosed price exceeds the first undisclosed price.

12. The method as set forth in claim 11 further comprising:

allowing receipt of another offer to purchase the item at a second disclosed price after a first period of time period at the e-commerce computer system from the one of the client computer systems that provided the received offer at the first disclosed price if the first disclosed price did not exceed the first undisclosed pride; and selling the item with the e-commerce computer system to the one of the client computer systems that provided the second disclosed price if the second disclosed price exceeds the first undisclosed price.

13. A computer system for use in e-commerce, the system comprising:

a sales model management system in a computer system that establishes one of two or more sales models for an item;

a variable management system in the computer system that establishes a value for at least one variable which is a threshold for changing the established sales model to another one of the sales models before the item is offered for sale under the established sales model; and at least one virtual storefront in the computer system that offers the item for sale under the established sales model;

the variable management system in the computer system that determines if the established value is satisfied and automatically moves the item from the established sales model to the another one of the sales models when the value is satisfied.

14. The system as set forth in claim 13 further comprising:

a purchasing system in the computer system that receives a selected price for the item;

a monitoring system in the computer system that monitors which of the two or more sales models is established for the item; and a notification system in the computer system that provides a notification when one of a listed price of the item is at or below the selected price for the item and the monitored one of the two or more sales models is one of an instant buy sales model and an auction sales model.

15. The system as set forth in claim 13 wherein the computer system provides a plurality of storefronts each offering one or more of the items for sale under one of the sales models.

16. The system of claim 15 further comprising a single cart system in the computer system that collects all of the one or more of the items from the plurality of storefronts.

17. The system of claim 15 further comprising a unified checkout system in the computer system that provides for the purchase of the items from the plurality of storefronts with a single payment transaction.

18. The system as set forth in claim 13 wherein the at least one variable comprises at least one of demand elasticity, sales rate, cash generation, time within the established one of the two or more sales models, and quantity of the item.

19. The system as set forth in claim 13 wherein the two or more sales models comprise a retail sales model, an instant buy sales model, and an auction sales model.

20. The system as set forth in claim 13 further comprising a creation system in the computer system that creates the at least one virtual storefront for the established sales model.

21. The system of claim 20 wherein the creation system further comprises:

a template selection system in the computer system that provides a plurality of templates to select from for the at least one virtual storefront;

at least one of color scheme selection system and a color picker system a color scheme in the computer system to create the at least one virtual storefront;

a selection system in the computer system that receives a selection from one of the color scheme selection system and the color picker system.

22. The system as set forth in claim system of claim 20 wherein the creation system in the computer system further comprises a creation system that creates at least one of a main page, an about page, and a contact page.

23. The system of claim 19 wherein the instant buy sales model further comprises the at least one virtual storefront in the computer system that offers the item for sale at a first undisclosed price and a purchasing system in the computer system that receives an offer to purchase the item at a first disclosed price and sells the item if the first disclosed price exceeds the first undisclosed price.

24. The system as set forth in claim 23 wherein the purchasing system allows receipt of another offer to purchase the item at a second disclosed price after a first period of time period if the first disclosed price did not exceed the first undisclosed price and sells the item if the second disclosed price exceeds the first undisclosed price.

* * * * *